(12) United States Patent
Hartwich

(10) Patent No.: US 9,742,584 B2
(45) Date of Patent: Aug. 22, 2017

(54) CONTROLLER AREA NETWORK WITH FLEXIBLE DATA-RATE

(71) Applicant: Robert Bosch GmbH, Stuttgart (DE)

(72) Inventor: Florian Hartwich, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 69 days.

(21) Appl. No.: 14/427,499

(22) PCT Filed: Sep. 17, 2013

(86) PCT No.: PCT/EP2013/069224
§ 371 (c)(1),
(2) Date: Mar. 11, 2015

(87) PCT Pub. No.: WO2014/044658
PCT Pub. Date: Mar. 27, 2014

(65) Prior Publication Data
US 2016/0254924 A1 Sep. 1, 2016

(30) Foreign Application Priority Data

Sep. 20, 2012 (EP) ..................... 12185269

(51) Int. Cl.
*H04J 3/16* (2006.01)
*H04L 12/40* (2006.01)
(Continued)

(52) U.S. Cl.
CPC ............ *H04L 12/4013* (2013.01); *H04J 3/22* (2013.01); *H04L 1/0002* (2013.01);
(Continued)

(58) Field of Classification Search
CPC .............. H04L 12/40; H04L 1/00–1/02; H04L 12/4135; H04L 69/10; H04L 69/18; H04J 3/22
See application file for complete search history.

(56) References Cited

U.S. PATENT DOCUMENTS

2002/0077007 A1* 6/2002 Dagenais .............. B63B 35/731
440/1
2008/0231434 A1* 9/2008 Hermann ........... H04B 10/1141
340/431
(Continued)

FOREIGN PATENT DOCUMENTS

| EP | 2 031 802 | 3/2009 |
|---|---|---|
| WO | WO 02/069578 | 9/2002 |
| WO | WO 2011/161153 | 12/2011 |

OTHER PUBLICATIONS

International Search Report for PCT/EP2013/069224, dated Oct. 18, 2013.
(Continued)

*Primary Examiner* — Ian N Moore
*Assistant Examiner* — Phong La
(74) *Attorney, Agent, or Firm* — Norton Rose Fulbright US LLP; Gerard Messina

(57) ABSTRACT

In a method for serial communication of data frames between nodes connected by a bus system, the transmitter and receiver roles are assigned to the nodes for each data frame by the arbitration procedure defined in the CAN-Standard ISO 11898-1. The exchanged data frames, which include multiple bits, have a logical structure according to the CAN-Standard ISO 11898-1, including a Start-Of-Frame-Bit, an Arbitration Field, a Control Field, a Data Field, a CRC Field, an Acknowledge Field and an End-Of-Frame Field. Each bit has a bit time which is divided into Time Segments. In response to a predefined value of a specific bit within the Control Field a first node of a first node group restarts its protocol decoding state machine and waits until it has synchronized itself to the bus activity and a second node of a second node group communicates using CAN FD Specification protocol.

9 Claims, 3 Drawing Sheets

(51) Int. Cl.
  *H04L 29/06* (2006.01)
  *H04L 12/413* (2006.01)
  *H04J 3/22* (2006.01)
  *H04L 1/00* (2006.01)

(52) U.S. Cl.
  CPC .......... *H04L 12/4135* (2013.01); *H04L 69/10* (2013.01); *H04L 69/18* (2013.01); *H04L 2001/0094* (2013.01); *H04L 2012/40215* (2013.01)

(56) References Cited

U.S. PATENT DOCUMENTS

| | | | | |
|---|---|---|---|---|
| 2010/0150176 A1* | 6/2010 | Yakashiro | ......... | H04L 12/40006 370/475 |
| 2012/0051241 A1* | 3/2012 | Mori | ....................... | H04L 12/12 370/252 |
| 2012/0071990 A1* | 3/2012 | Asano | ............... | H04L 12/40006 700/11 |

OTHER PUBLICATIONS

Robert Bosch GmbH: "CAN with Flexible Data-Rate: white paper, version 1.0" Internet citation, Apr. 2011, pp. 1-13.

* cited by examiner

Standard Format Norm CAN

Extended Format Norm CAN

SOF = Start Of Frame
RTR = Remote Transmission Request
SRR = Substitute Remote Request
IDE = Identifier Extension Bit Standard Format CAN FD Extended Format CAN FD Standard Format CAN FD, bit-rate switched
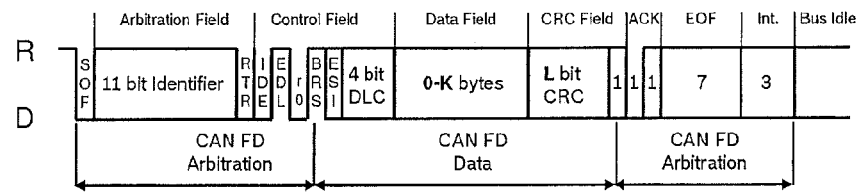
Extended Format CAN FD, bit-rate switched
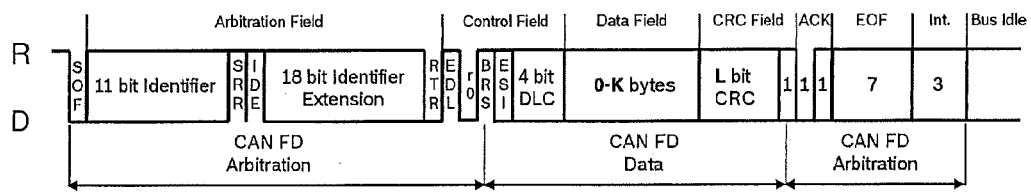
Fig. 2
| DLC  | Norm CAN     | DLC 1        | DLC 2 | DLC 3 |
|------|--------------|--------------|-------|-------|
| 0000 | 0 (not used) | 0 (not used) | 16    | 0     |
| 0001 | 1            | 1            | 1     | 1     |
| 0010 | 2            | 2            | 2     | 2     |
| 0011 | 3            | 3            | 3     | 3     |
| 0100 | 4            | 4            | 4     | 4     |
| 0101 | 5            | 5            | 5     | 5     |
| 0110 | 6            | 6            | 6     | 6     |
| 0111 | 7            | 7            | 7     | 7     |
| 1000 | 8            | 8            | 8     | 8     |
| 1001 | 8            | 9            | 9     | 12    |
| 1010 | 8            | 10           | 10    | 16    |
| 1011 | 8            | 11           | 11    | 20    |
| 1100 | 8            | 12           | 12    | 24    |
| 1101 | 8            | 13           | 13    | 32    |
| 1110 | 8            | 14           | 14    | 48    |
| 1111 | 8            | 15           | 15    | 64    |
Fig. 3

CONTROLLER AREA NETWORK WITH FLEXIBLE DATA-RATE

BACKGROUND OF THE INVENTION

1. Field of the Invention

The present invention relates to a controller area network having a flexible data rate.

2. Description of the Related Art

The acceptance and introduction of serial communication to more and more applications has led to requirements that the bandwidth for the serial communication needs to be increased.

A widely used protocol for serial communication is the CAN protocol as specified in the BOSCH CAN Specification 2.0, which can be downloaded from the Robert Bosch GmbH website: http://www.semiconductors.bosch.de, and in the international Standard ISO 11898-1. This CAN protocol is referred to in the following as "Norm CAN".

Two factors limit the effective data-rate in CAN networks, first the minimum bit time required for the function of the CAN bus arbitration method and second the relation between the numbers of data bits and frame bits in a CAN message.

Recently a new protocol has been developed, that is called "CAN with Flexible Data-Rate" or CAN FD. It still uses the CAN bus arbitration method, it increases the bit-rate by switching to a shorter bit time after the end of the arbitration process and returns to the longer bit time at the CRC Delimiter, before the receivers send their acknowledge bits. The effective data-rate is increased by allowing longer data fields. CAN uses four bits as Data Length Code resulting in 16 different codes, but only the first nine values are used, codes [0-8] standing for data field length of [0-8] bytes. In CAN, the codes [9-15] are defined to signify eight data bytes. In CAN FD, the codes are used to signify longer data fields.

The CAN FD protocol is described in a protocol specification titled "CAN with Flexible Data-Rate Specification", in the following referred to as the CAN FD Specification. Version 1.0 was released Apr. 17, 2012 and made available to the public for download at the Robert Bosch GmbH website: http://www.semiconductors.bosch.de As long as unmodified Norm CAN controllers are used, a mixed network of Norm CAN nodes and CAN FD nodes can only communicate in Norm CAN format. That is, all nodes in the network must have a CAN FD protocol controller for CAN FD communication, but all CAN FD protocol controllers are also able to take part in Norm CAN communication. If the CAN FD communication is limited to data fields with a length of up to eight data bytes, it is not necessary to change the application program apart from the initial configuration of the controller.

BRIEF DESCRIPTION OF THE INVENTION

The present invention describes a modification to Norm CAN implementations, which allows the modified CAN implementations (that are not able to send and receive CAN FD frames) to tolerate CAN FD frames. Toleration of CAN FD frames means, that these modified implementations ignore CAN FD frames and do not disturb them. This has the advantage that a coexistence of (modified according to this invention) CAN nodes and CAN FD nodes using the same bus wires becomes possible. CAN FD nodes communicate using CAN FD frames which are tolerated but not received by the modified CAN nodes. Modified CAN nodes communicate using Norm CAN frames which can be received by both the modified CAN nodes and the CAN FD nodes.

BRIEF DESCRIPTION OF THE DRAWINGS

FIG. 2 shows the position where the bit-rate is switched within a message.
FIG. 3 shows an example for the coding of the number of data bytes by the DATA LENGTH CODE.

DETAILED DESCRIPTION OF THE INVENTION

Figure 1A:
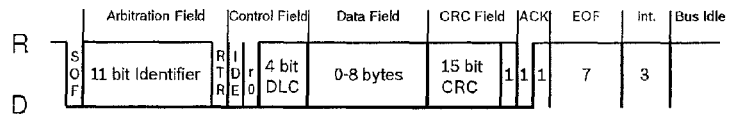
FIG. 1a shows examples of Norm CAN frames.
Figure 1A:
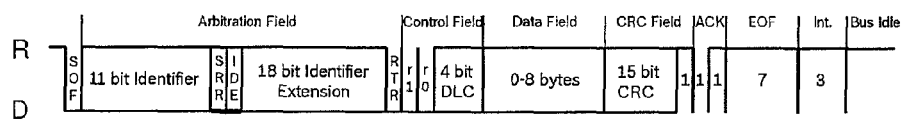
Figure 1B:
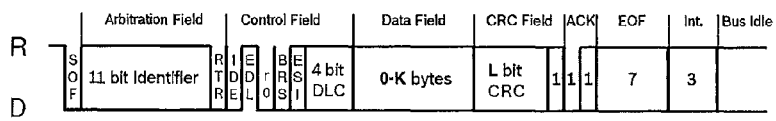
FIG. 1b shows examples of CAN FD frames.
Figure 1B:
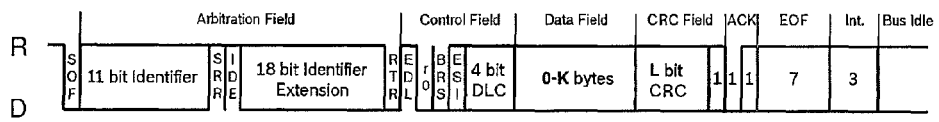

The Controller Area Network (CAN) is a serial communications protocol which efficiently supports distributed real-time control with a very high level of security. Its domain of application ranges from high speed networks to low cost multiplex wiring. In automotive electronics, engine control units, sensors, anti-skid-systems, etc. are connected using CAN with bitrates up to 1 Mbit/s. At the same time it is cost effective to build into vehicle body electronics, e.g. lamp clusters, electric windows etc. to replace the wiring harness otherwise required.

CAN FD (CAN with Flexible Data-Rate) complements CAN in applications that require a higher data-rate. CAN FD protocol controllers are also able to take part in Norm CAN communication, making it possible to use CAN FD only in specific operation modes, e.g. software-download at end-of-line or maintenance.

CAN FD requires two sets of bit timing configuration registers, one bit time for the arbitration phase and one bit time for the data field. The bit time for the arbitration phase has the same limitations as in Norm CAN networks, the bit time for the data field is chosen with regard to the performance of the chosen transceiver and the characteristics of the CAN FD network.

Norm CAN transceivers can be used for CAN FD, dedicated transceivers are optional. CAN FD protocol controllers may provide additional interface signals to switch—in the phase with higher bit-rate—a dedicated CAN FD transceiver into an alternate operating mode.

Dedicated CAN FD transceivers may use an alternate coding system in the phase with higher bit-rate, not restricted to CAN's NRZ coding.

Basic Concepts CAN FD:

A CAN FD frame consists of the same elements as a CAN frame, the difference is that in a CAN FD frame, the Data Field and the CRC Field may be longer. Message validation requires, as in CAN, a dominant Acknowledge bit from at least one receiver. The CAN FD fault confinement with Error Frames, Error Counters, Error Passive level and Bus-Off level is the same as in CAN, it is based on the same five error types: Bit Error, Stuff Error, CRC Error, Form Error, and Acknowledgement Error.

Frame Format:

Examples of Norm CAN and CAN FD frames are pictured in FIG. 1.

CAN FD supports both Identifier lengths of the CAN protocol, the 11 bit long "Standard Format" and the 29 bit long "Extended Format". CAN FD frames have the same structure as Norm CAN frames, the differentiation between Norm CAN frames and CAN FD frames is at a reserved bit usually named "r0" or "r1" and located before the Data Length Code in the Control Field. In a CAN FD frame, this bit is transmitted recessive and is called EDL. It is followed by additional Control Field bits as compared to Norm CAN frames, e.g. the bit BRS.

FIG. 2 shows the position where the bit-rate is switched within a message.

The first part of a CAN FD frame, until the reserved bit that distinguishes the protocols, is transmitted with the same bit-rate as a CAN frame. The bit-rate is switched—if the recessive EDL bit has been received—depending on the value of the BRS bit. The bit-rate is switched starting with the BRS bit until the CRC Delimiter is reached or until the CAN FD controller sees an error condition that results in the starting of an Error Frame. CAN FD Error Frames, as well as ACK Field, End of Frame, and Overload Frames are transmitted with the same bit-rate as a CAN Error Frame. The bit-rate is switched to the shorter bit time at the reserved bit BRS, if this bit BRS is transmitted recessive. This is shown in FIG. 2 by arrows dividing the CAN FD messages in one part "CAN FD Data", where the high bit-rate is used, surrounded by two parts named "CAN FD Arbitration", where the lower bit-rate is used.

The number of bytes in the DATA FIELD is indicated by the DATA LENGTH CODE. This DATA LENGTH CODE is 4 bits wide and is transmitted within the CONTROL FIELD.

The coding of the DATA LENGTH CODE is different in CAN FD. The first nine codes are the same, but the following codes, that in CAN specify a DATA FIELD of eight bytes, specify longer DATA FIELDS in CAN FD. All Remote Frames shall use a DATA LENGTH CODE of zero, regardless of the DATA LENGTH CODE of the corresponding Data Frame.

An example for the coding of the number of data bytes by the DATA LENGTH CODE is described in FIG. 3.

The CRC FIELD contains the CRC SEQUENCE followed by a CRC DELIMITER.

CRC SEQUENCE: The frame check sequence is derived from a cyclic redundancy code (BCH Code).

In order to carry out the CRC calculation the polynomial to be divided is defined as the polynomial, the coefficients of which are given by the relevant bit stream. CAN FD uses different CRC polynomials for different frame length. For frames with up to eight data bytes, the same polynomial as in CAN is used.

For frames with up to eight data bytes, the relevant bit stream is the destuffed bit stream consisting of START OF FRAME, ARBITRATION FIELD, CONTROL FIELD, DATA FIELD (if present) and, for the 15 lowest coefficients, by 0. This polynomial is divided (the coefficients are calculated modulo-2) by the generator-polynomial, which, with a Hamming Distance HD=6, is best suited for frames with bit counts less than 127 bits:

$$X15+X14+X10+X8+X7+X4+X3+1.$$

For frames with more than eight bytes in the DATA FIELD, different (and longer) CRC polynomials are used, adapted to the length of the frame. The CRC Field is lengthened accordingly. In longer frames, also the stuff bits that occur before the CRC SEQUENCE shall be protected by the CRC. Each CRC SEQUENCE is calculated in a separate shift register block. At the start of the frame, in all nodes all CRC SEQUENCES shall be calculated concurrently, until after the arbitration one of the CRC SEQUENCES is selected by the reserved bit and by the DLC. Only the selected CRC SEQUENCE can cause a CRC Error.

CRC DELIMITER: The CRC SEQUENCE is followed by the CRC DELIMITER which consists of one or two 'recessive' bits. A transmitter shall send only one 'recessive' bit as CRC Delimiter but all nodes shall accept two 'recessive' bits before the edge from recessive to dominant that starts the Acknowledge Slot. Note: When the CRC Delimiter is detected, the CAN FD protocol controllers switch back to the bit-rate with the longer bit time.

The phase-shift between the nodes in a CAN network is defined by the delay times in the transceivers and the propagation time on the CAN bus line. The phase-shift is the same in CAN and in CAN FD, but it is proportionally larger in the phase with the shorter bit time. All receivers in the network may have a different phase-shift to the transmitter, since they see the transmitted edges at different times. To compensate for these phase-shifts when the bit-rate is switched back to the longer bit time, one additional bit time tolerance is allowed before and after the edge from recessive to dominant that starts the Acknowledge Slot.

Figure 4:
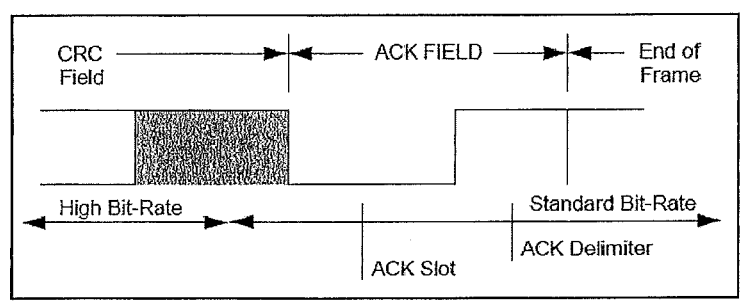
FIG. 4 shows an ACK FIELD containing the ACK SLOT and the ACK DELIMITER.

The ACK FIELD is two or three bits long and contains the ACK SLOT and the ACK DELIMITER, as shown in FIG. 4. In the ACK FIELD the transmitting station sends two 'recessive' bits. A RECEIVER which has received a valid message correctly, reports this to the TRANSMITTER by sending a 'dominant' bit during the ACK SLOT (it sends 'ACK').

ACK SLOT: All stations having received the matching CRC SEQUENCE report this within the ACK SLOT by superscribing the 'recessive' bit of the TRANSMITTER by a 'dominant' bit. To compensate for phase shifts between the receivers, all nodes accept a two bit long 'dominant' phase of overlapping ACK bits as a valid ACK.

ACK DELIMITER: The ACK DELIMITER is the second or third bit of the ACK FIELD and has to be a 'recessive' bit. As a consequence, the ACK SLOT is surrounded by two 'recessive' bits (CRC DELIMITER, ACK DELIMITER).

END OF FRAME: Each DATA FRAME and REMOTE FRAME is delimited by a flag sequence consisting of seven 'recessive' bits.

Figure 5:
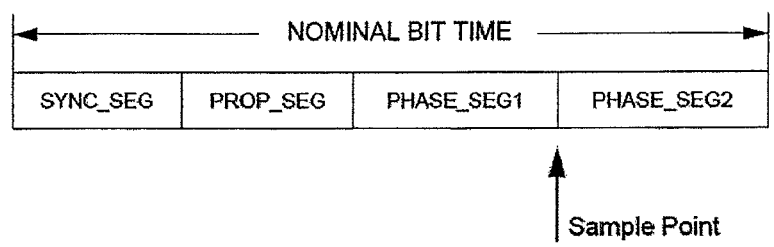
FIG. 5 shows the various time segments of a bit time.

Bit Timing Requirements:

The CAN FD protocol defines two bit-rates, the first bit-rate with a longer bit time and the second bit-rate with a shorter bit time. The definition for the first bit-rate is the same as for the NOMINAL BIT RATE and the NOMINAL BIT TIME in the CAN protocol specification. The definition for the second bit-rate requires a separate configuration register set. Both bit times consist of separate non-overlapping time segments, these segments SYNCHRONIZATION SEGMENT (SYNC_SEG)
PROPAGATION TIME SEGMENT (PROP_SEG)
PHASE BUFFER SEGMENT1 (PHASE_SEG1)
PHASE BUFFER SEGMENT2 (PHASE_SEG2)
form the bit time as shown in FIG. 5.

The time segments for the two bit rates of the CAN FD protocol are defined by two sets of configuration registers.

SYNC SEG: This part of the bit time is used to synchronize the various nodes on the bus. An edge is expected to lie within this segment.

PROP SEG: This part of the bit time is used to compensate for the physical delay times within the network. It is twice the sum of the signal's propagation time on the bus line, the input comparator delay, and the output driver delay.

PHASE SEG1, PHASE SEG2: These Phase-Buffer-Segments are used to compensate for edge phase errors. These segments can be lengthened or shortened by resynchronization.

SAMPLE POINT: The SAMPLE POINT is the point of time at which the bus level is read and interpreted as the value of that respective bit. Its location is at the end of PHASE_SEG1.

INFORMATION PROCESSING TIME: The INFORMATION PROCESSING TIME is the time segment starting with the SAMPLE POINT reserved for calculation the subsequent bit level.

The length of the time segments is defined in integer multiples of the TIME QUANTUM, with the TIME QUANTUM is a fixed unit of time derived from the oscillator period. There exists a programmable prescaler, with integral values, ranging at least from 1 to 32. Starting with the MINIMUM TIME QUANTUM, the TIME QUANTUM can have a length of $$TIME\ QUANTUM(n)=m(n)*MINIMUM\ TIME\ QUANTUM$$

with m the value of the prescaler. Two values for the prescaler, m(1) and m(2) are defined the CAN FD protocol, one for each bit-rate, resulting in two different lengths of the TIME QUANTUM.

Length of Time Segments for the First Bit-Rate:
  SYNC_SEG(1) is 1 TIME QUANTUM(1) long.
  PROP_SEG(1) is programmable to be 1, 2, . . . , 8 TIME QUANTA(1) long.
  PHASE_SEG1(1) is programmable to be 1, 2, . . . , 8 TIME QUANTA(1) long.
  PHASE_SEG2(1) is the maximum of PHASE_SEG1(1) and the INFORMATION PROCESSING TIME
  The INFORMATION PROCESSING TIME is less than or equal to 2 TIME QUANTA(1) long.

Length of Time Segments for the Second Bit-Rate
  SYNC_SEG(2) is 1 TIME QUANTUM(2) long.
  PROP_SEG(2) is programmable to be 0, 1, 2, . . . , 8 TIME QUANTA(2) long.
  PHASE_SEG1(2) is programmable to be 1, 2, . . . , 8 TIME QUANTA(2) long.
  PHASE_SEG2(2) is the maximum of PHASE_SEG1(2) and the INFORMATION PROCESSING TIME
  The INFORMATION PROCESSING TIME is less than or equal to 2 TIME QUANTA long.

The total number of TIME QUANTA in a bit time has to be programmable at least from 8 to 25.

The position of the SAMPLE POINT may differ in the two bit timing configurations, the length of the PROP_SEG may be reduced in the configuration for the second bit-rate.

CAN FD Implementation:

CAN FD protocol implementations shall provide the same controller-host interfaces as CAN protocol implementations to provide an easy migration path for existing CAN applications. The minimum required differences are new configuration registers for the CAN FD operation.

The CAN FD protocol allows frames with more than eight data bytes. It is not required that all CAN FD implementations support longer frames, CAN FD implementations may be limited to a subset of DATA FIELD length. A CAN FD implementation that supports only up to e.g. eight data bytes in a frame shall not treat received longer frames as an error, fault-free longer frames shall be acknowledged and shall take part in acceptance filtering. Received data bytes that exceed the CAN FD's data handling capacity shall be discarded. A such limited CAN FD implementation that is requested to transmit a longer frame shall fill up the data bytes in the frame that exceed the data handling capacity with a constant byte pattern. This pattern shall be chosen so that it does not cause the insertion of STUFF BITS, e.g. 0x33.

CAN FD Tolerance OF CAN Implementations:

CAN FD shares the physical layer with the CAN protocol. The frame format however, is different. There are two new control bits in the CAN FD frame, the first, named EDL, enabling the new frame format with different data length coding and the second, named BRS, optionally switching to a faster bit rate after the arbitration is decided. New CRC polynomials are introduced to secure the longer CAN FD frames with the same Hamming distance as in the proven CAN protocol. The CAN FD frame format has been defined so that messages in CAN frame format and in CAN FD frame format can coexist within the same network.

The present invention describes a modification of the Norm CAN protocol that allows CAN implementations to tolerate CAN FD frames. Toleration of CAN FD frames means that they ignore CAN FD frames and do not disturb them.

According to the CAN FD Specification, CAN FD implementations that are designed according to the CAN FD Specification and Norm CAN implementations that are designed according to the BOSCH CAN Specification 2.0 can communicate with each other as long as it is not made use of the CAN FD frame format. This enables CAN systems to migrate gradually into CAN FD systems. In the introductory phase, it is possible to use CAN FD only in specific operation modes, e.g. software-download at end-of-line programming, while other controllers that do not support CAN FD are kept in standby.

CAN FD implementations are able to decode all CAN frames, but Norm CAN implementations according to BOSCH CAN Specification 2.0 or ISO 11898-1. would destroy a CAN FD frame with an ERROR FRAME.

The present invention describes a modification of the protocol that allows CAN implementations to tolerate CAN FD frames, meaning that the CAN FD frames are ignored, not destroyed. Two existing features of the CAN protocol are combined to make CAN implementations CAN FD tolerant. First the counter that is used to check for the occurrence of eleven consecutive recessive bits, when a CAN implementations is synchronizing itself to the bus activity after a restart or during the BUS_OFF RECOVERY SEQUENCE. Second the edge detection mechanism that strobes the CAN bus input once each TIME QUANTUM as basis for the bit synchronization.

CAN FD EDL Management:

The CAN implementations modified according to the present invention become CAN FD tolerant using the following mechanism: Immediately after detecting a recessive bit at the bit position r0 in a Norm CAN frame with Standard Format or the bit position r1 in a Norm CAN frame with Extended Format (i.e. corresponding to the position of EDL bit of a CAN FD frame, see FIGS. 1a and 1b) the modified CAN implementations restart their protocol decoding state machine. They restart without changing their error counters and without sending an ERROR FRAME and perform a CAN FD Recovery, as described in the following.

CAN FD Recovery:

The CAN FD Recovery starts with the restart of the protocol decoding state machine, as mentioned. The protocol decoding state machine will then wait until it has synchronized itself to the bus activity by checking for a sequence of eleven consecutive recessive bits. There must not be any recessive to dominant edge inside this sequence, such an edge shall restart the bit count. When this sequence is detected, the unit shall be Idle, ready for a START OF FRAME, switching to either Receiver or Transmitter.

The advantage of this mechanism is that it is assured that the modified CAN node will wait until the CAN FD message has been successively transmitted (or interrupted by an error frame, if an error reason is detected by a CAN FD node). During transmission of the CAN FD message the requirement of a sequence of eleven consecutive recessive bits will never become true and therefore the modified CAN node will not finish the CAN FD Recovery as described.

Therefore, the CAN FD Recovery method allows the modified CAN implementations to tolerate all CAN FD frames.

It is advantageous that the bit time inside the CAN FD frame DATA phase (see FIG. 2) is not shorter than one TIME QUANTUM in the CAN FD ARBITRATION phase. Otherwise it could be possible that eleven consecutive recessive bits are observed by the modified CAN node in the CAN FD frame in rare cases.

Detection of a CAN FD frame will not cause an increment of the error counters, the CAN implementation will be able to resume bus activity immediately after the CAN FD frame has finished.

The invention claimed is:

1. A method for serial communication system, comprising:
exchanging data frames between at least one transmitting node and at least one receiving node connected by a bus system;
wherein:
transmitter and receiver roles are assigned to respective nodes of the at least one transmitting node and the at least one receiving node for each data frame by an arbitration procedure defined in the Controller Area Network (CAN) Standard ISO 11898-1;
the exchanged data frames have a logical structure according to the CAN-Standard ISO 11898-1;
the data frames are composed of a sequence of bits;
the logical structure of the data frames includes a Start-Of-Frame-Bit, an Arbitration Field, a Control Field, a Data Field, a CRC Field, an Acknowledge Field and an End-Of-Frame Field;
each bit of the data frames has a bit time;
each bit time is divided into multiple Time Segments; and
in response to a predefined value of a specific bit within the Control Field of the exchanged data frames, (i) a first node belonging to a first group of nodes of the at least one transmitting node and the at least one receiving node restarts its protocol decoding state machine and waits until the first node has synchronized itself to the bus activity, and (ii) a second node belonging to a second group of nodes of the at least one transmitting node and the at least one receiving node communicates using the communication protocol according to CAN with Flexible Data-Rate (CAN FD) Specification.

2. The method of claim 1, wherein the first node restarts its protocol decoding state machine without changing its error counters.

3. The method of claim 2, wherein the first node restarts its protocol decoding state machine without sending an ERROR FRAME.

4. The method of claim 3, wherein the first node synchronizes itself to the bus activity by checking for a sequence of eleven consecutive recessive bits.

5. The method of claim 4, wherein:
the second node communicates using a shorter bit time in a CAN FD DATA phase of the transmitted frames;
the CAN FD DATA phase begins during transmission of the Control Field and ends during transmission of the Acknowledge Field;
the length of the Time Segments is defined in integer multiples of the TIME QUANTUM, wherein the TIME QUANTUM is a fixed unit of time derived from the oscillator period; and
the bit time inside the CAN FD DATA phase is not shorter than one TIME QUANTUM in the CAN FD ARBITRATION phase.

6. A serial communication system, comprising:
at least one transmitting node and at least one receiving node connected by a bus system and exchanging data frames;
wherein:
transmitter and receiver roles are assigned to respective nodes of the at least one transmitting node and the at least one receiving node for each data frame by an arbitration procedure defined in the Controller Area Network (CAN) Standard ISO 11898-1;
the exchanged data frames have a logical structure according to the CAN-Standard ISO 11898-1;
the data frames are composed of a sequence of bits;
the logical structure of the data frames includes a Start-Of-Frame-Bit, an Arbitration Field, a Control Field, a Data Field, a CRC Field, an Acknowledge Field and an End-Of-Frame Field;
each bit of the data frames has a bit time;
each bit time is divided into multiple Time Segments; and
in response to a predefined value of a specific bit within the Control Field of the exchanged data frames, (i) a first node belonging to a first group of nodes of the at least one transmitting node and the at least one receiving node restarts its protocol decoding state machine and waits until the first node has synchronized itself to the bus activity, and (ii) a second node belonging to a second group of nodes of the at least one transmitting node and the at least one receiving node communicates using the communication protocol according to CAN with Flexible Data-Rate (CAN FD) Specification.

7. The serial communication system of claim 6, wherein the first node restarts its protocol decoding state machine without changing its error counters.

8. The serial communication system of claim 7, wherein the first node restarts its protocol decoding state machine without sending an ERROR FRAME.

9. The serial communication system of claim 8, wherein the first node synchronizes itself to the bus activity by checking for a sequence of eleven consecutive recessive bits.

* * * * *